(12) United States Patent
Akamatsu

(10) Patent No.: US 11,785,166 B2
(45) Date of Patent: Oct. 10, 2023

(54) IMAGE FORMING SYSTEM

(71) Applicant: KYOCERA Document Solutions Inc., Osaka (JP)

(72) Inventor: Shinji Akamatsu, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/101,181

(22) Filed: Jan. 25, 2023

(65) Prior Publication Data

US 2023/0247166 A1    Aug. 3, 2023

(30) Foreign Application Priority Data

Jan. 31, 2022   (JP) ................................. 2022-012938

(51) Int. Cl.
*H04N 1/44*     (2006.01)
*G06F 3/12*     (2006.01)

(52) U.S. Cl.
CPC ......... *H04N 1/4413* (2013.01); *G06F 3/1222* (2013.01); *G06F 3/1274* (2013.01)

(58) Field of Classification Search
None
See application file for complete search history.

(56) References Cited

U.S. PATENT DOCUMENTS

| 2011/0007901 A1* | 1/2011 | Ikeda | H04B 5/02 380/270 |
| 2020/0341696 A1* | 10/2020 | Shibuta | G06F 3/1286 |
| 2023/0117819 A1* | 4/2023 | Kalwani | G06F 3/1285 358/1.6 |

FOREIGN PATENT DOCUMENTS

JP      2013-161460      8/2013

* cited by examiner

*Primary Examiner* — Darryl V Dottin
(74) *Attorney, Agent, or Firm* — LEX IP MEISTER, PLLC

(57) ABSTRACT

An image forming system includes: a transmission terminal; a reception terminal; and an image forming apparatus. The transmission terminal i) selects the reception terminal transmitting image data and outputs selection information, ii) receives terminal position information of the reception terminal and apparatus position information of the image forming apparatus, iii) acquires the terminal position information and the apparatus position information, vi) authenticates the reception terminal and the image forming apparatus based on the terminal position information and the apparatus position information, and outputs authentication information, and v) transmits job data based on the authentication information. The reception terminal i) acquires terminal position information based on the selection information, and ii) transmits the terminal position information. The image forming apparatus forms an image of the job data on a sheet.

9 Claims, 7 Drawing Sheets

IMAGE FORMING SYSTEM

INCORPORATION BY REFERENCE

This application is based upon and claims the benefit of priority from the corresponding Japanese Patent Application No. 2022-012938 filed on Jan. 31, 2021, the entire contents of which are incorporated herein by reference.

FIELD

The present disclosure relates to an image forming system.

BACKGROUND

A typical management system is disclosed in which a function of an image forming apparatus is operated from a monitoring server. However, the typical management system does not disclose a system in which an image is formed by the image forming apparatus whose positional relationship with a reception terminal has been authenticated.

SUMMARY

An image forming system includes: a transmission terminal; a reception terminal; and an image forming apparatus.

The transmission terminal includes: a selection part; a terminal reception part; a position information acquisition part; an authentication part; and a transmission part.

The selection part selects the reception terminal that transmits image data and outputs selection information indicating the reception terminal that is selected.

The terminal reception part receives terminal position information of the reception terminal and apparatus position information of the image forming apparatus.

The position information acquisition part acquires the terminal position information of the reception terminal and the apparatus position information of the image forming apparatus.

The authentication part authenticates the reception terminal and the image forming apparatus based on the terminal position information of the reception terminal and the apparatus position information of the image forming apparatus, and outputs authentication information.

The transmission part transmits job data based on the authentication information indicating that the reception terminal and the image forming apparatus have been authenticated.

The reception terminal includes: a terminal-side position information acquisition part; and a terminal transmission part.

The terminal-side position information acquisition part acquires terminal position information of the reception terminal based on the selection information.

The terminal transmission part transmits the terminal position information.

The image forming apparatus includes an image forming part that forms an image of the job data on a sheet.

DETAILED DESCRIPTION

Figure 1:
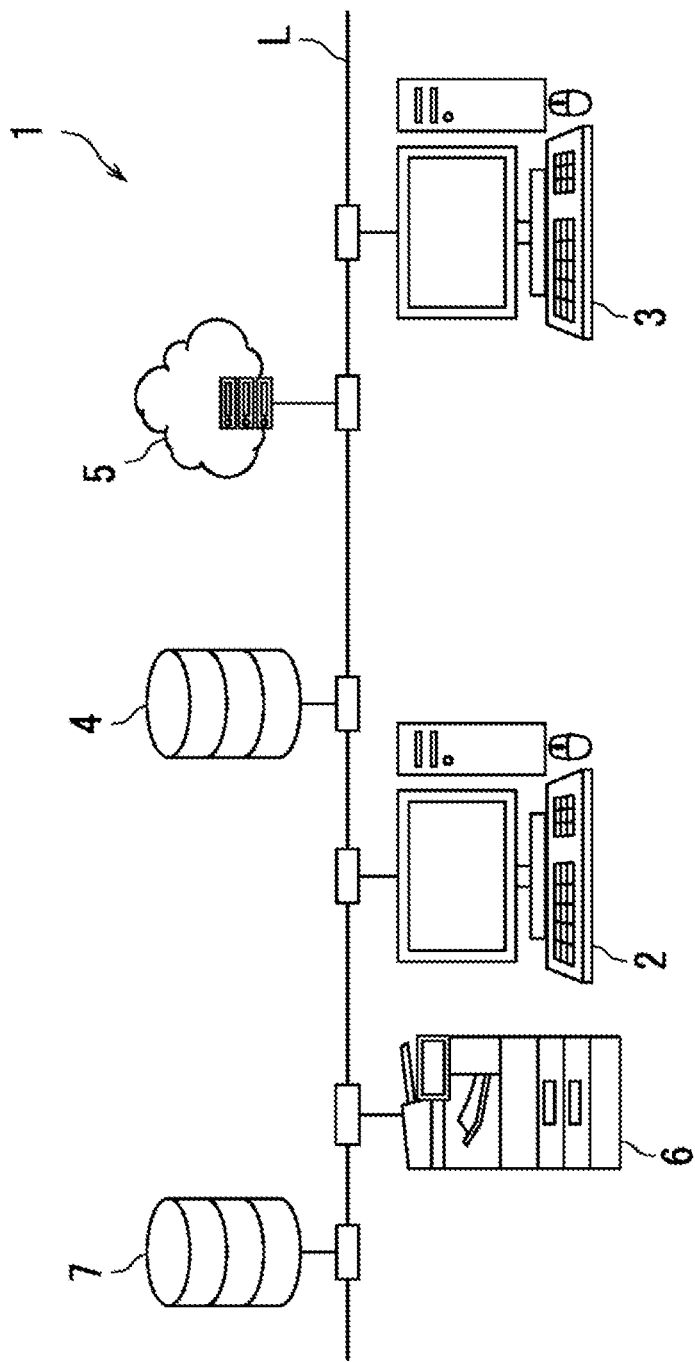
FIG. 1 is a diagram illustrating a configuration of an image forming system according to the present embodiment.

First, the configuration of an image forming system 1 according to the present embodiment will be described with reference to FIG. 1. FIG. 1 is the diagram illustrating the configuration of the image forming system 1 according to the present embodiment. The present embodiment described in FIG. 1 can be applied to all the embodiments and specific examples of the present disclosure.

As illustrated in FIG. 1, the image forming system 1 includes a transmission terminal 2, a reception terminal 3, a cloud 4, a server 5, an image forming apparatus 6, and a storage device 7. Provided that the cloud 4, the server 5, and the storage device 7 are not essential constituent elements in the present embodiment.

An outline of the image forming system 1 according to the present embodiment is as follows. For example, when the reception terminal 3 is moved away from the transmission terminal 2 by work at home, or the like, the transmission terminal 2 specifies a located position of the reception terminal 3 and causes the image forming apparatus 6 located near the reception terminal 3 to output a document.

As illustrated in FIG. 1, the transmission terminal 2, the reception terminal 3, the cloud 4, the server 5, the image forming apparatus 6, and the storage device 7 are communicably connected to each other via a line L. The line L includes, for example, a local area network (LAN), an intranet, a wide area network moo, the Internet, and the like.

The LAN is a computer network used in, for example, businesses such as an office and a factory of a corporation and a government office, a school, and a home. It refers to technical methods and standards of communication cables and data link layers typified by Ethernet (Registered Trademark) in a narrow sense, and refers to the computer network and an information processing system used in the office and the home in a broad sense. The intranet is, for example, a network environment created only within an organization such as a company.

The WAN is a wide area network which extends, for example, from an urban area to a suburb, a prefecture outside, and an overseas area, and is a public network which connects scattered LANs. The Internet is a global information communication network that interconnects multiple computer networks using, for example, the Internet Protocol suite. The WAN is implemented worldwide by the Internet.

The transmission terminal 2 is, for example, a management terminal installed in the office, the government office, the school, the factory, or the like. The specific example of the management terminal is a personal computer. The personal computer is hereinafter abbreviated as PC. The specific example of the PC includes a desktop PC, a laptop PC, a notebook PC, a tablet, and a smartphone.

For example, the reception terminal 3 is a mobile terminal that can be moved to the home, a spot office, or the like, when a user performs work at home, or the like. The specific example of the mobile terminal includes the laptop PC, the notebook PC, the tablet, and the smartphone.

The cloud 4 is a usage form that provides computer resources via the computer network such as the Internet and, for example, includes an application, a platform, and an infrastructures.

The server 5 stores data and provides corresponding data when there is a request via the communication line.

Figure 2:
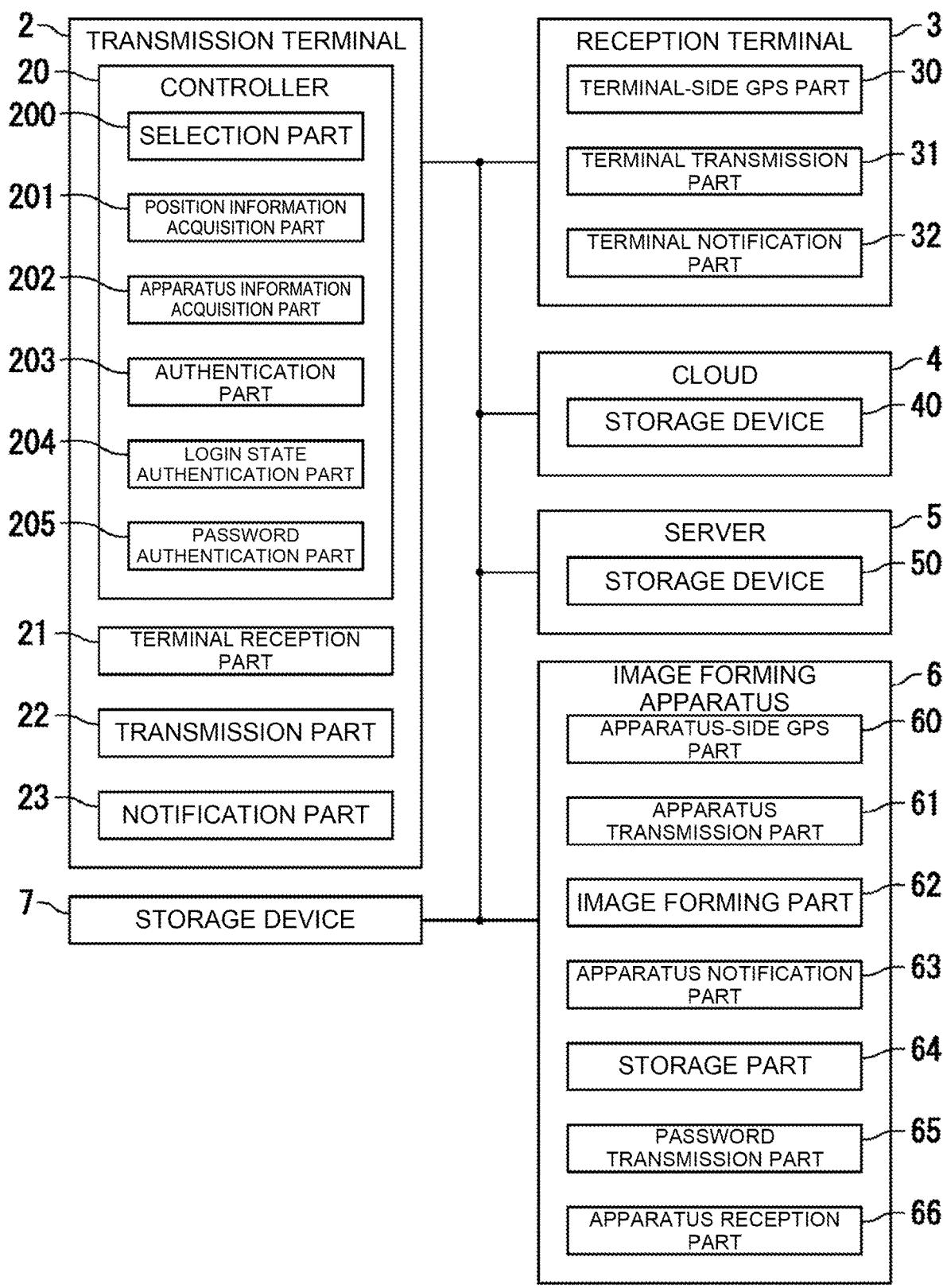
FIG. 2 is a block diagram illustrating a configuration of the image forming system according to the present embodiment.

Next, the description is given of the configuration of the transmission terminal 2, the reception terminal 3, the cloud 4, the server 5, the image forming apparatus 6, and the storage device 7 with reference to FIG. 2. FIG. 2 is the block diagram illustrating the configuration of the image forming system 1 according to the present embodiment.

The transmission terminal 2 includes a controller 20, a terminal reception part 21, a transmission part 22, and a notification part 23.

Controller 20 is, for example, a processor such as a central processing part (CPU). The controller 20 may be an integrated circuit such as a system-on-a-chip (SoC) in which other constituent elements are integrated. The controller 20 may be formed by combining a plurality of integrated circuits. The controller 20 comprehensively controls the operation of the transmission terminal 2 to implement various functions.

The terminal reception part 21 and the transmission part 22 can be implemented by a coder/decoder (CODEC) for example.

The notification part 23 may be implemented by an Application Specific Integrated Circuit (ASIC) for example.

The controller 20 includes a selection part 200, a position information acquisition part 201, an apparatus information acquisition part 202, an authentication part 203, a login state authentication part 204, and a password authentication part 205.

The selection part 200, the position information acquisition part 201, the apparatus information acquisition part 202, the authentication part 203, the login state authentication part 204, and the password authentication part 205 can be implemented by the ASIC for example.

The reception terminal 3 includes a terminal-side position information acquisition part 30, a terminal transmission part 31, and a terminal notification part 32.

An example of the terminal-side position information acquisition part 30 is a Global Positioning System (GPS). The GPS is a satellite positioning system operated by the United States America. Hereinafter, the terminal-side position information acquisition part 30 is referred to as a terminal-side GPS part 30.

The terminal transmission part 31 may be implemented by the CODEC for example.

The terminal notification part 32 can be implemented by the ASIC for example.

The cloud 4 may include the storage device 40.

The server 5 may include the storage device 50.

The storage device 40 and the storage device 50 store program and the data. The storage device 40 and the storage device 50 store a processing result of the controller 20 of the transmission terminal 2 temporarily or non-temporarily. The storage device 40 and the storage device 50 may include storage device such as a semiconductor storage device and a magnetic storage device. The storage device 40 and the storage device 50 may include a plurality of types of storage devices. The storage device 40 and the storage device 50 may include a combination of a portable storage medium such as a memory card and a storage medium reading device.

The image forming apparatus 6 includes an apparatus-side GPS part 60, an apparatus transmission part 61, an apparatus notification part 63, a storage part 64, a password transmission part 65, and an apparatus reception part 66 as control functions.

The apparatus-side GPS part 60 may have the same configuration as the terminal-side GPS part 30 described above.

The apparatus transmission part 61, the password transmission part 65, and the apparatus reception part 66 can be implemented by the CODEC for example.

The apparatus notification part 63 may be implemented by the ASIC for example.

The storage part 64 may have the configuration similar to those of the storage device 40 and the storage device 50 described above.

The image forming apparatus 6 may be a multifunction peripheral. The multifunction peripheral is a combination of an image reading function of the image reading device and an image forming function of the image forming apparatus 6. The multifunction peripheral functions as, for example, a scanner, a printer, a copier, a telephone, a printer, a facsimile, and the like.

The image reading device includes a document tray, a document conveyance device, an image reading part, and a document ejection tray.

The image reading device reads an image described on the document and outputs image information. The example of the image reading device is a scanner. The document conveyance device can be attached to the image reading device. The example of the document conveyance device is an automatic document feeder (ADF).

The document tray stores the document.

The image reading part reads the image from the document conveyed from the document tray.

The image reading part generates image data from a read image. The image reading part adopts a contact image sensor (CIS) method or a charge coupled devices (CCD) method.

The document ejection tray stores the document from which the image has been read.

The image forming apparatus 6 includes, as its image forming functions, a sheet feed part, a conveyance part, the image forming part 62, a fixing part, and an ejection part.

The sheet feed part includes a sheet tray and a pickup roller. The sheet tray stores the sheet therein. The pickup roller picks up the sheet stored in the sheet tray one by one and feeds the sheet to the conveyance part.

The image forming part 62 forms the image on the sheet with a toner or an ink. When the image forming apparatus 6 performs an electrophotographic method, the image forming part 62 includes a photoreceptor, a charging device, an exposure device, a developing device, a transfer device, a cleaning device, and a discharging device.

The photoreceptor is, for example, a photosensitive drum. The photosensitive drum has a photosensitive layer on an outer peripheral surface thereof. The example of the photosensitive drum is a selenium drum or an organic photoconductor (OPC).

The charging device charges the photosensitive layer of the photoreceptor to a predetermined potential. The example of a charging device is a corona discharge device.

The exposure device irradiates and exposes the photosensitive layer of the photoreceptor with laser light. The exposure device exposes the photosensitive layer of the photoreceptor based on the image data. An electrostatic latent image is formed on the photoreceptor as a result. The example of the exposure device is a light emitting diode (LED).

For example, the developing device stores a two component developer including a carrier including a magnetic body and the toner. The developing device then develops the electrostatic latent image formed on the photoreceptor with the toner to form a toner image on the photoreceptor. The transfer device transfers the toner image on the photoreceptor to the sheet. The cleaning device removes residual toner remaining on the photoreceptor after the transfer. The discharging device causes discharging of the photoreceptor.

When the image forming apparatus 6 is an inkjet printer, the image forming part 62 includes an ink cartridge, an ink tank, a pump, a head, a nozzle, an electrode, and a conveyance belt.

The ink cartridges and the ink tank store, for example, aqueous inks of respective colors of yellow (Y), magenta (M), cyan (C), and black (Bk).

The pump supplies the ink from the ink tank to the head.

In the head, a large number of nozzles forming pixels are arranged. The ink of a color corresponding to the image data is supplied from the ink tank to the head, based on the image data. The ink is ejected from the nozzle toward the sheet.

The electrode includes, for example, a charging electrode and a deflection electrode. The charging electrode charges the ink ejected from the nozzle. The deflection electrode controls a flying direction of the charged ink.

The conveyance belt is disposed opposite the nozzle of the head and conveys the sheet. The image is formed on the sheet conveyed by the conveyance belt with the ink ejected from the nozzle of the head.

Next, when the image forming apparatus 6 performs the electrophotographic method, the fixing device applies heat and pressure to the toner image developed on the sheet to fix the toner image on the sheet. The fixing device includes, for example, a fixing roller, a heater, and a press roller.

The fixing roller is a hollow cylindrical roller. The fixing roller is pressed against the press roller. The press roller and the fixing roller form a nip part. The press roller is rotationally driven by a driver (not illustrated) and forms a nip part with the fixing roller to rotate the fixing roller.

The heater heats the fixing roller by receiving electric power from an electric power source (not illustrated). The heater is disposed adjacent to an inner peripheral surface of the fixing roller. The sheet conveyed to the fixing device is passed through the nip part and heated by the heater, and the toner image is fixed.

In a case where the image forming apparatus 6 is an inkjet printer, a fixing device is not necessary.

The sheet ejection device ejects the sheet to the outside of the main body of the image forming apparatus 6. The sheet ejection device includes a sheet ejection roller and a sheet ejection tray. The sheet ejection roller ejects the sheet conveyed by the conveyance device from the fixing device to the sheet ejection tray. The sheet ejection tray stores the ejected sheet therein.

First Embodiment

Hereinafter, operation and effect of each device configuring the image forming system 1 according to the first embodiment will be specifically described. The first embodiment may be applied to all other embodiments.

As illustrated in FIG. 2, the selection part 10 of the controller 20 of the transmission terminal 2 selects the reception terminal 3 to which the image data is to be transmitted and outputs selection information indicating the selected reception terminal 3.

An administrator may wish to provide an imaged document, as well as the image data, to a user who works at home. The administrator operates the transmission terminal 2 to select the reception terminal 3 owned by the user. The selection part 200 included in the controller 20 of the transmission terminal 2 selects the reception terminal 3 to which the image data is to be transmitted. The selection part 200 outputs the selection information indicating the selected reception terminal 3.

The selection part 200 may confirm that the reception terminal 3 and the image forming apparatus 6 are connected. That is, the selection part 200 may confirm that the image forming apparatus 6 and the reception terminal 3 are connected to the same network as the network to which the transmission terminal 2 and the reception terminal 3 are connected.

The terminal-side position information acquisition part 30 (terminal-side GPS part 30) of the reception terminal 3 acquires the terminal position information of the reception terminal 3 on the basis of the selection information. That is, the reception terminal 3 recognizes that its own terminal has been selected, based on the selection information. The reception terminal 3 controls the terminal-side GPS part 30 and acquires the terminal position information of the own terminal.

The controller 20 may determine whether to transmit job data. The controller 20 may hold the job data without transmitting it.

The terminal transmission part 31 of the reception terminal 3 transmits the terminal position information to the transmission terminal 2.

The terminal reception part 21 of the transmission terminal 2 receives the terminal position information of the reception terminal 3 and the apparatus position information of the image forming apparatus 6. That is, the arrangement location of the reception terminal 3 changes due to work at home, or the like. Therefore, the transmission terminal 2 needs to receive the terminal position information of the reception terminal 3 from the terminal-side GPS part 30 of the reception terminal 3. The image forming apparatus 6 is fixedly installed in a predetermined place such as the office. Therefore, the transmission terminal 2 may receive the apparatus position information from the image forming apparatus 6 regularly or irregularly.

The terminal reception part 21 may receive the apparatus position information of yet another image forming apparatus 6.

The position information acquisition part 201 of the transmission terminal 2 acquires the terminal position information of the reception terminal 3 and the apparatus position information of the image forming apparatus 6.

The authentication part 203 of the transmission terminal 2 authenticates the reception terminal 3 and the image forming apparatus 6 based on the terminal position information of the reception terminal 3 and the apparatus position information of the image forming apparatus 6 and outputs authentication information.

For example, the authentication part 203 authenticates whether the reception terminal 3 is in a registered user's house, a registered spot office, or the like, on the basis of the terminal position information.

The authentication part 203 may authenticate that the reception terminal 3 and the image forming apparatus 6 are connected.

When authenticating that the reception terminal 3 is in the registered user's house, the registered spot office, or the like, the authentication part 203 outputs authentication information indicating that the reception terminal 3 has been authenticated.

When failing to authenticate that the reception terminal 3 is in the registered user's house, the registered spot office, or the like, the authentication part 203 outputs the authentication information indicating that the reception terminal 3 is not authenticated.

For example, the authentication part 203 authenticates whether or not the image forming apparatus 6 is installed in the registered office, or the like, on the basis of the apparatus position information.

When the authentication part 203 authenticates that the image forming apparatus 6 is installed in the registered office, or the like, the authentication part 123 outputs the authentication information indicating that the authentication is completed.

When it was not possible to authenticate that the image forming apparatus 6 is installed in the registered office, or the like, the authentication part 203 outputs the authentication information indicating that it is not authenticated.

The transmission part 22 of the transmission terminal 2 transmits the job data on the basis of the authentication information indicating that the reception terminal 3 and the image forming apparatus 6 are authenticated.

The job data is, for example, data on a document for which an operator operating the transmission terminal 2 desires the user possessing the reception terminal 3 to form the image with the image forming apparatus 6 located in a predetermined place.

Based on the authentication information indicating that the reception terminal 3 and the image forming apparatus 6 have been authenticated, the notification part 23 of the transmission terminal 2 may notify the reception terminal 3 or the image forming apparatus 6 that the job data is to be or has been transmitted.

The notification part 23 may notify the reception terminal 3 or the image forming apparatus 6 that the job data indicates that image formation is possible in the image forming apparatus 6. The notification part 23 may notify the user that the job data has been transmitted. The notification part 23 can notify of preferable various kinds of information in various situations.

A message indicating that the job data is to be transmitted may be displayed on a first display (not illustrated) of the reception terminal 3 or a second display (not illustrated) of the image forming apparatus 6.

The image forming apparatus 6 may further include a storage part 64. The storage part 64 stores the job data.

According to the first embodiment, the job data is stored in the storage part 64 of the image forming apparatus 6 even after the job data has been transmitted to the image forming apparatus 6. Therefore, it is possible to prevent the image forming apparatus 6 from directly forming the image of the document and to prevent the job data from being formed as the image by an unspecified third party.

The image forming system 1 may further include at least one of the cloud 4, the server 5, and the storage device 7. The cloud 4 may include the storage device 40. The server 5 may include the storage device 50. The cloud 4, the server 5, or the storage device 7 may store the job data.

According to the first embodiment, for example, job data can be stored in one of the cloud 4, the server 5, and the storage device 7 before the image forming apparatus 6 is authenticated. Therefore, the job data can be temporarily saved in one of the cloud 4, the server 5, and the storage device 7. Therefore, it is possible to more preferably prevent the job data from being imaged by any unspecified third party.

The image forming part 62 of the image forming apparatus 6 forms the image of the job data on the sheet.

The notification part 23 of the transmission terminal 2 may notify the reception terminal 3 that the image of the job data has been formed in the image forming apparatus 6.

According to the first embodiment, a user who is remote from the office, or the like, can preferably form an image of an important document, or the like, by using the image forming apparatus 6 located in the predetermined place.

According to the first embodiment, it is possible to provide the image forming system 1 in which the authenticated reception terminal 3 can cause the authenticated image forming apparatus 6 to form the image of the document.

That is, the reception terminal 3 and the image forming apparatus 6 are authenticated by the transmission terminal 2. Therefore, the authenticated reception terminal 3 and the authenticated image forming apparatus 6 are located in a secure area. Therefore, the user of the reception terminal 3 can directly operate the authenticated image forming apparatus 6 to obtain the transmitted document in a short time.

Second Embodiment

Next, the image forming system 1 according to the second embodiment will be described. The second embodiment may be applied to all other embodiments. In the second embodiment, the apparatus notification part 63 of the image forming apparatus 6 may provide a notification of login state information indicating whether the image forming apparatus 6 is logged in.

That is, after the transmission part 22 of the transmission terminal 2 transmits the job data based on the authentication information indicating that the reception terminal 3 and the image forming apparatus 6 are authenticated, the transmission part 22 may request the image forming apparatus 6 to notify the login state.

The user of the reception terminal 3 can know that job data is being transmitted from the transmission terminal 2. The user operates the image forming apparatus 6 to log in. The job data may be temporarily stored in the image forming apparatus 6.

Alternatively, the image forming apparatus 6 may be required to notify the login state before the transmission part 22 of the transmission terminal 2 transmits job data.

The controller 20 of the transmission terminal 2 may further include a login state authentication part 14.

The login state authentication part 204 authenticates the login state based on the login state information of the image forming apparatus 6.

Upon authenticating that the image forming apparatus 6 is in the login state, the transmission part 22 may transmit the job data.

Based on the authentication information indicating that it has been authenticated that the image forming apparatus 6 is in the login state, the notification part 23 of the transmission terminal 2 may notify the reception terminal 3 or the image forming apparatus 6 that the job data is to be or has been transmitted.

The login state authentication part 204 may authenticate the login state based on the login state information of the reception terminal 3.

Upon authenticating that the reception terminal 3 is in the login state, the transmission part 22 may transmit the job data.

Based on the authentication information indicating that it has been authenticated that the reception terminal 3 is in the login state, the notification part 23 of the transmission terminal 2 may notify the reception terminal 3 or the image forming apparatus 6 that the job data is to be or has been transmitted.

The notification part 23 may notify the reception terminal 3 or the image forming apparatus 6 that the job data indicates that the image formation is possible in the image forming apparatus 6.

The image forming part 62 of the image forming apparatus 6 forms the image of the job data on the sheet.

The notification part 23 of the transmission terminal 2 may notify the reception terminal 3 that the image of the job data has been formed in the image forming apparatus 6.

According to the second embodiment, the image forming apparatus 6 forms the image of the job data after authenticating the login state of the user, and thus it is possible to more preferably distribute an important document, or the like, to a desired user.

Third Embodiment

Next, the third embodiment will be described. The third embodiment may be applied to all other embodiments.

In the third embodiment, the selection part 200 of the controller 20 of the transmission terminal 2 selects the reception terminal 3 to which image data is to be transmitted and outputs selection information indicating the selected reception terminal 3.

The terminal transmission part 31 of the reception terminal 3 may transmit a terminal IP address.

The image forming apparatus 6 may include the apparatus transmission part 61 that transmits an apparatus IP address.

The terminal transmission part 31 of the reception terminal 3 transmits the terminal IP address of the own terminal on the basis of the selection of the own terminal by the selection information.

The apparatus transmission part 61 of the image forming apparatus 6 may transmit the apparatus IP address of the image forming apparatus 6 on the basis of the selection of the image forming apparatus 6 by the selection information. The apparatus transmission part 61 may transmit the apparatus IP address of its own apparatus regularly or irregularly regardless of the selection information.

The terminal reception part 21 of the transmission terminal 2 may receive the terminal IP address of the reception terminal 3 and the apparatus IP address of the image forming apparatus 6.

The transmission terminal 2 may include the apparatus information acquisition part 202. The apparatus information acquisition part 202 may acquire the terminal IP address and the apparatus IP address.

The authentication part 203 of the transmission terminal 2 may authenticate the reception terminal 3 and the image forming apparatus 6 based on the terminal IP address and the apparatus IP address.

That is, the authentication part 203 of the transmission terminal 2 may authenticate whether the reception terminal 3 and the image forming apparatus 6 are registered or not based on the terminal IP address and the apparatus IP address as well as the terminal position information of the reception terminal 3 and the apparatus position information of the image forming apparatus 6 and output the authentication information.

Based on the authentication information indicating that the reception terminal 3 and the image forming apparatus 6 have been authenticated, the notification part 23 of the transmission terminal 2 may notify the reception terminal 3 or the image forming apparatus 6 that the job data is to be or has been transmitted.

The notification part 23 may notify the reception terminal 3 or the image forming apparatus 6 that the job data indicates that the image formation is possible in the image forming apparatus 6.

The image forming part 62 of the image forming apparatus 6 may form the image of the job data on the sheet based on the authentication information indicating that it has been authenticated that the reception terminal 3 and the image forming apparatus 6 have been registered based on the terminal IP address and the apparatus IP address.

According to the third embodiment, the reception terminal 3 and the image forming apparatus 6 are authenticated based on the registration information of the reception terminal 3 and the image forming apparatus 6 as well as the positional information of the reception terminal 3 and the image forming apparatus 6, and thus it is possible to preferably prevent an important document, or the like, from leaking to any third party and to more preferably distribute an important document, or the like, to the desired user.

Fourth Embodiment

Next, the image forming system 1 according to the fourth embodiment will be described. The fourth embodiment may be applied to all other embodiments.

In the image forming system 1 according to the fourth embodiment, the reception terminal 3 may further include the terminal notification part 32. The terminal notification part 32 notifies the login state information indicating whether or not the reception terminal 3 is logged in.

That is, the selection part 200 included in the controller 20 of the transmission terminal 2 selects the reception terminal 3 to which the image data is to be transmitted and outputs the selection information indicating the selected reception terminal 3.

The selected reception terminal 3 determines whether it has been logged in by the registered user, and outputs the login state information indicating that it has been logged in by the registered user.

The transmission terminal 2 may transmit job data on the basis of the login state information indicating that the reception terminal 3 has been logged in by the registered user.

Based on the login state information indicating that the reception terminal 3 has been logged in by the registered user, the notification part 23 of the transmission terminal 2 may notify the reception terminal 3 or the image forming apparatus 6 that the job data is to be or has been transmitted.

The notification part 23 may notify the reception terminal 3 or the image forming apparatus 6 that the job data indicates that the image formation is possible in the image forming apparatus 6.

According to the fourth embodiment, since the job data is transmitted to the reception terminal 3 to which the registered user logs in, it is possible to more preferably prevent an important document, or the like, from leaking to any third party.

Fifth Embodiment

Next, the image forming system 1 according to the fifth embodiment will be described. The fifth embodiment may be applied to all other embodiments.

In the image forming system 1 according to the fifth embodiment, the image forming apparatus 6 may further include the password transmission part 65. The password transmission part 65 transmits the password input by the user.

That is, the selection part 200 included in the controller 20 of the transmission terminal 2 selects the reception terminal 3 to which the image data is to be transmitted and outputs the selection information indicating the selected reception terminal 3.

The password transmission part 65 transmits the password input by the user.

The terminal reception part 21 of the transmission terminal 2 receives the password.

The controller 20 of the transmission terminal 2 may further include a password authentication part 15. The password authentication part 205 authenticates the password and outputs authentication information.

The transmission part 22 of the transmission terminal 2 transmits the authentication information to the image forming apparatus 6. Specifically, the transmission part 22 of the transmission terminal 2 transmits the authentication information indicating that the password has been authenticated to the image forming apparatus 6.

The image forming apparatus 6 may further include the apparatus reception part 66. The apparatus reception part 66 receives the authentication information.

The image forming part 62 of the image forming apparatus 6 forms the image of the job data on the sheet based on the authentication information.

Based on the authentication information indicating that the password has been authenticated, the notification part 23 of the transmission terminal 2 may notify the reception terminal 3 or the image forming apparatus 6 that the job data is to be or has been transmitted.

The notification part 23 may notify the reception terminal 3 or the image forming apparatus 6 that the job data indicates that the image formation is possible in the image forming apparatus 6.

According to the fifth embodiment, an image of the document based on the job data is formed by the image forming apparatus 6 for which the password has been authenticated. Therefore, it is possible to more preferably prevent an important document, or the like, from leaking to any third party.

Sixth Embodiment

Next, the image forming system 1 according to a sixth embodiment will be described. The sixth embodiment may be applied to all other embodiments.

The storage part 64 of the image forming apparatus 6 may delete the job data if the image forming apparatus 6 does not form the image of the job data on the sheet for a predetermined time.

The apparatus notification part 63 may detect whether the user has collected the sheet and provide a notification of the detection information. The notification part 23 of the transmission terminal 2 may notify the user that the output of the job data is completed.

Specifically, in a case where the image of the document based on the job data has not been formed for, for example, 10 minutes or more although the image forming apparatus 6 has been authenticated, it is conceivable that the registered user has left the image forming apparatus 6. Therefore, the image forming apparatus 6 does not form the image of the document based on the job data, and the storage part 64 erases the job data.

The notification part 23 of the transmission terminal 2 may notify the reception terminal 3 or the image forming apparatus 6 that the job data has been deleted from the storage part 64.

In a case where the image forming apparatus 6 does not form the image of the job data on the sheet for the predetermined time, the storage device 40 of the cloud 4, the storage device 50 of the server 5, or the storage device 7 may delete the job data.

Specifically, in a case where the image of the document based on the job data has not been formed for, for example, 10 minutes or more although the image forming apparatus 6 has been authenticated, it is conceivable that the registered user has left the image forming apparatus 6. Therefore, the image forming apparatus 6 does not form the image of the document based on the job data, and the storage device 40 of the cloud 4, the storage device 50 of the server 5, or the storage device 7 deletes the job data.

The notification part 23 of the transmission terminal 2 may notify the reception terminal 3 or the image forming apparatus 6 that the job data has been deleted from the storage device 40 of the cloud 4, the storage device 50 of the server 5, or the storage device 7. The notification part 23 may notify the user that the output of the job data has been cancelled.

According to the sixth embodiment, a situation in which the document related to which the image has been formed is left in the image forming apparatus 6 for a long time is suppressed, and thus it is possible to more preferably suppress leaking of an important document, or the like, to any third party.

Next, the control of the image forming system 1 will be described with reference to FIGS. 3 to 5. Some or all of the flowcharts of FIGS. 3 to 5 can be applied to other flowcharts.

Figure 3:
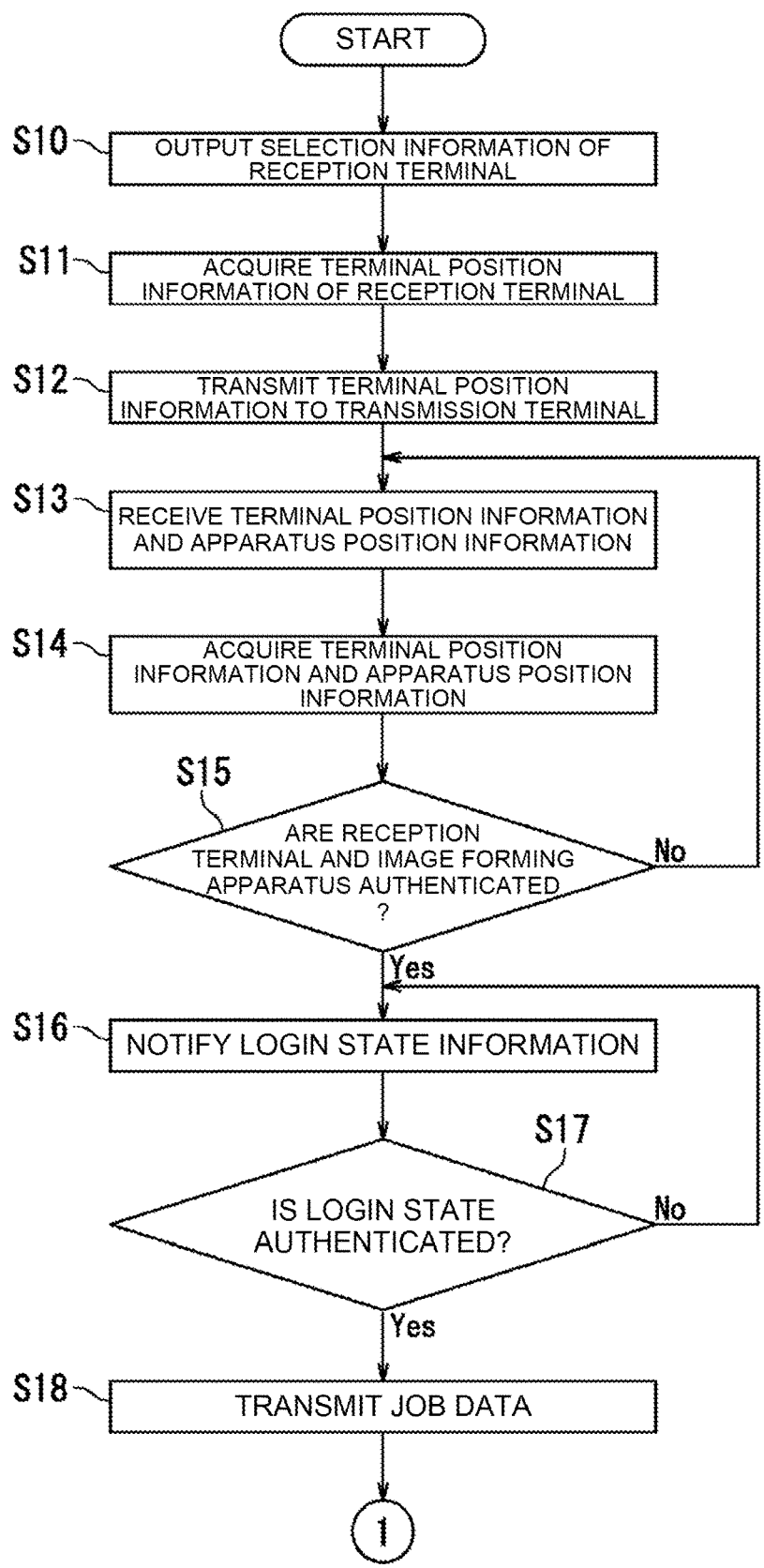
FIG. 3 is a flowchart illustrating control of the image forming system according to the present embodiment.
Figure 4:
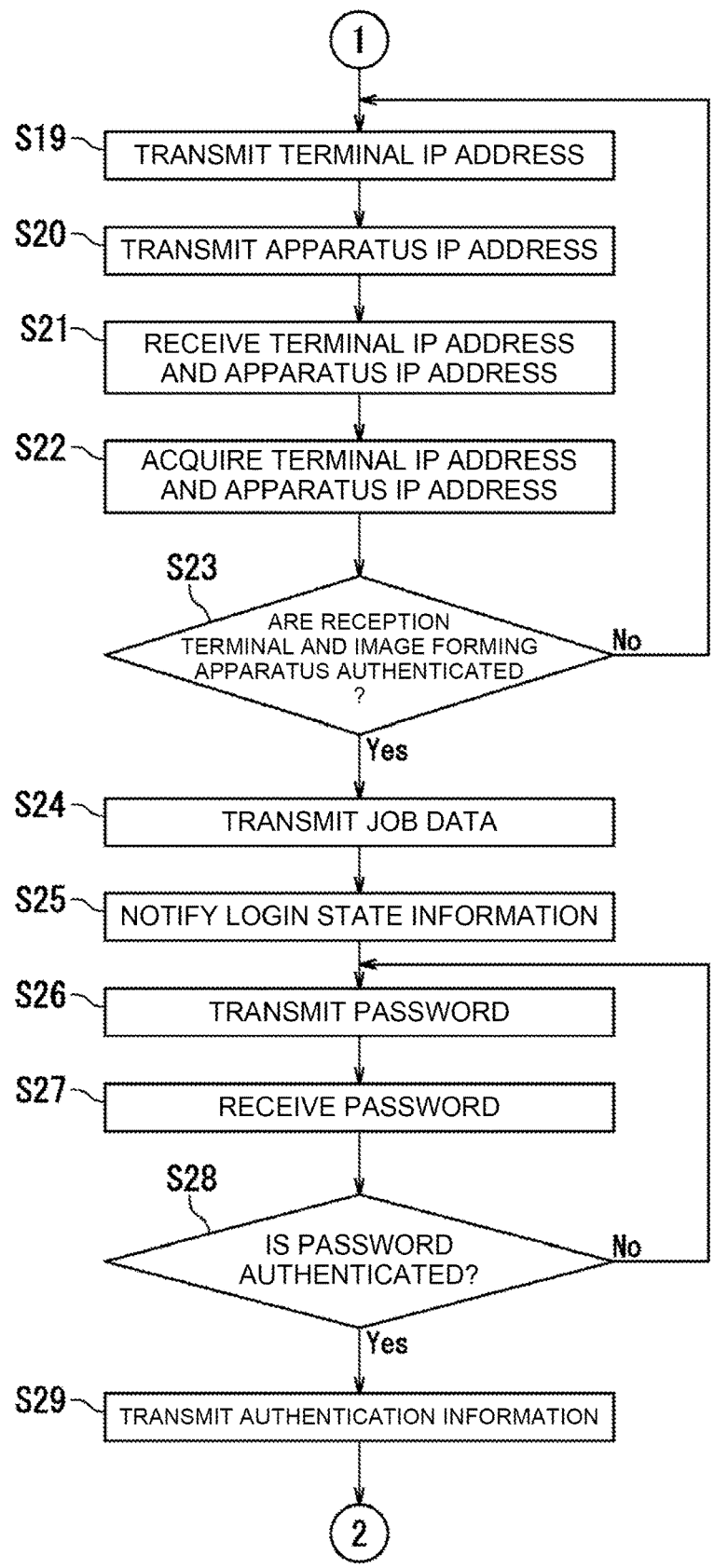
FIG. 4 is a flowchart illustrating control of the image forming system according to the present embodiment.
Figure 5:
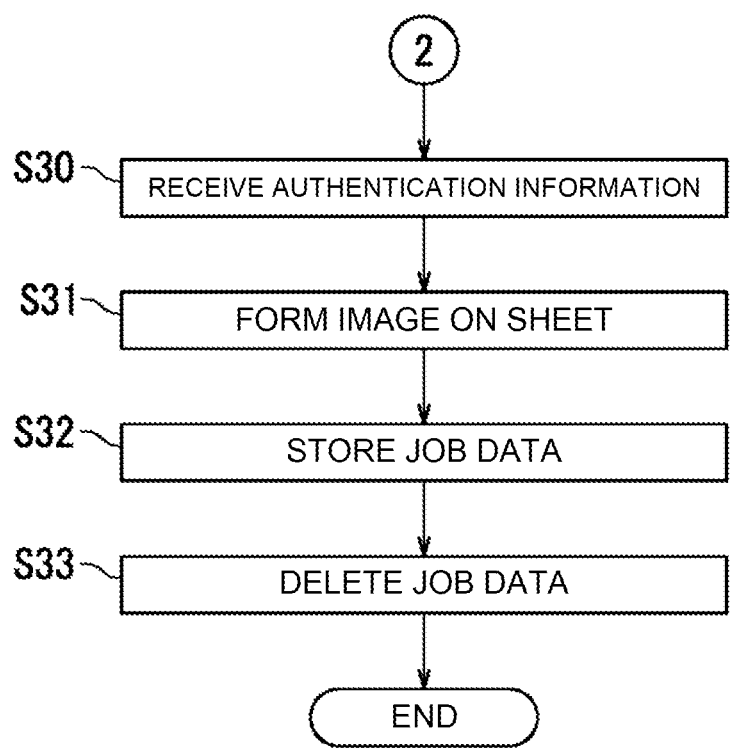
FIG. 5 is a flowchart illustrating control of the image forming system according to the present embodiment.

All steps of the flowcharts of FIGS. 3 to 5 may be processed. Some steps of the flowcharts of FIGS. 3 to 5 may be processed.

FIGS. 3 to 5 are flowcharts illustrating the control of the image forming system 1 according to the present embodiment.

As illustrated in FIGS. 3 to 5, the flowcharts include from step S10 to step S33. A specific description is provided below.

As illustrated in FIG. 3, in step S10, the selection part 200 of the transmission terminal 2 outputs the selection information of the reception terminal 3. The process proceeds to step S11.

In step S11, the terminal-side GPS part 30 of the reception terminal 3 acquires the terminal position information of the reception terminal 3 on the basis of the selection information. The process proceeds to step S12.

In step S12, the terminal transmission part 31 of the reception terminal 3 transmits the terminal position information to the transmission terminal 2. The process proceeds to step S13.

In step S13, the terminal reception part 21 of the transmission terminal 2 receives the terminal position information of the reception terminal 3 and the apparatus position information of the image forming apparatus 6. The process proceeds to step S14.

In step S14, the position information acquisition part 201 of the transmission terminal 2 acquires the terminal position information of the reception terminal 3 and the apparatus position information of the image forming apparatus 6. The process proceeds to step S15.

In step S15, the authentication part 203 of the transmission terminal 2 authenticates the reception terminal 3 and the image forming apparatus 6 on the basis of the terminal position information of the reception terminal 3 and the apparatus position information of the image forming apparatus 6. When the authentication was successful (Yes), the process proceeds to step S16. When the authentication was not successful (No), the process returns to step S13.

In step S16, the apparatus notification part 63 of the image forming apparatus 6 provides the notification of the login state information indicating whether or not the image forming apparatus 6 is logged in. The process proceeds to step S17.

In step S17, the login state authentication part 204 of the transmission terminal 2 authenticates the login state based on the login state information of the image forming apparatus 6. When the authentication was successful (Yes), the process proceeds to step S18. When the authentication was not successful (No), the process returns to step S16.

In step S18, when the transmission part 22 of the transmission terminal 2 authenticates that the image forming apparatus 6 is in the login state, the transmission part 22 transmits the job data. The process proceeds to step S19 illustrated in FIG. 4.

In step S19 illustrated in FIG. 4, the terminal transmission part 31 of the reception terminal 3 transmits the terminal IP address. The process proceeds to step S20.

In step S20, the apparatus transmission part 61 of the image forming apparatus 6 transmits the apparatus IP address. The process proceeds to step S21.

In step S21, the terminal reception part 21 of the transmission terminal 2 receives the terminal IP address of the reception terminal 3 and the apparatus IP address of the image forming apparatus 6. The process proceeds to step S22.

In step S22, the apparatus information acquisition part 202 of the transmission terminal 2 acquires the terminal IP address and the apparatus IP address. The process proceeds to step S23.

In step S23, the authentication part 203 of the transmission terminal 2 authenticates the reception terminal 3 and the image forming apparatus 6 based on the terminal IP address and the apparatus IP address. When the authentication was successful (Yes), the process proceeds to step S24. When the authentication was not successful (No), the process returns to step S19.

In step S24, the transmission part 22 of the transmission terminal 2 transmits the job data on the basis of the authentication information indicating that the reception terminal 3 and the image forming apparatus 6 have been authenticated. The process proceeds to step S25.

In step S25, the terminal notification part 32 of the reception terminal 3 provides the notification of the login state information indicating whether or not the reception terminal 3 is logged in. The process proceeds to step S26.

In step S26, the password transmission part 65 of the image forming apparatus 6 transmits the password input by the user. The process proceeds to step S27.

In step S27, the terminal reception part 21 of the transmission terminal 2 receives the password. The process proceeds to step S28.

In step S28, the password authentication part 205 of the controller 20 of the transmission terminal 2 authenticates the password and outputs the authentication information. When the authentication was successful (Yes), the process proceeds to step S29. When the authentication was not successful (No), the process returns to step S26.

In step S29, the transmission part 22 of the transmission terminal 2 transmits the authentication information to the image forming apparatus 6. The process proceeds to step S30 illustrated in FIG. 5.

In step S30 illustrated in FIG. 5, the apparatus reception part 66 of the image forming apparatus 6 receives the authentication information. The process proceeds to step S31.

In step S31, the image forming part 62 of the image forming apparatus 6 forms the image on the sheet based on the authentication information and the job data. The process proceeds to step S32.

In step S32, the storage part 64 of the image forming apparatus 6 stores the job data. The process proceeds to step S33.

In step S33, when the image forming apparatus 6 does not form the image of the job data on the sheet for the predetermined time, the storage part 64 of the image forming apparatus 6 deletes the job data. The process ends.

Figure 6:
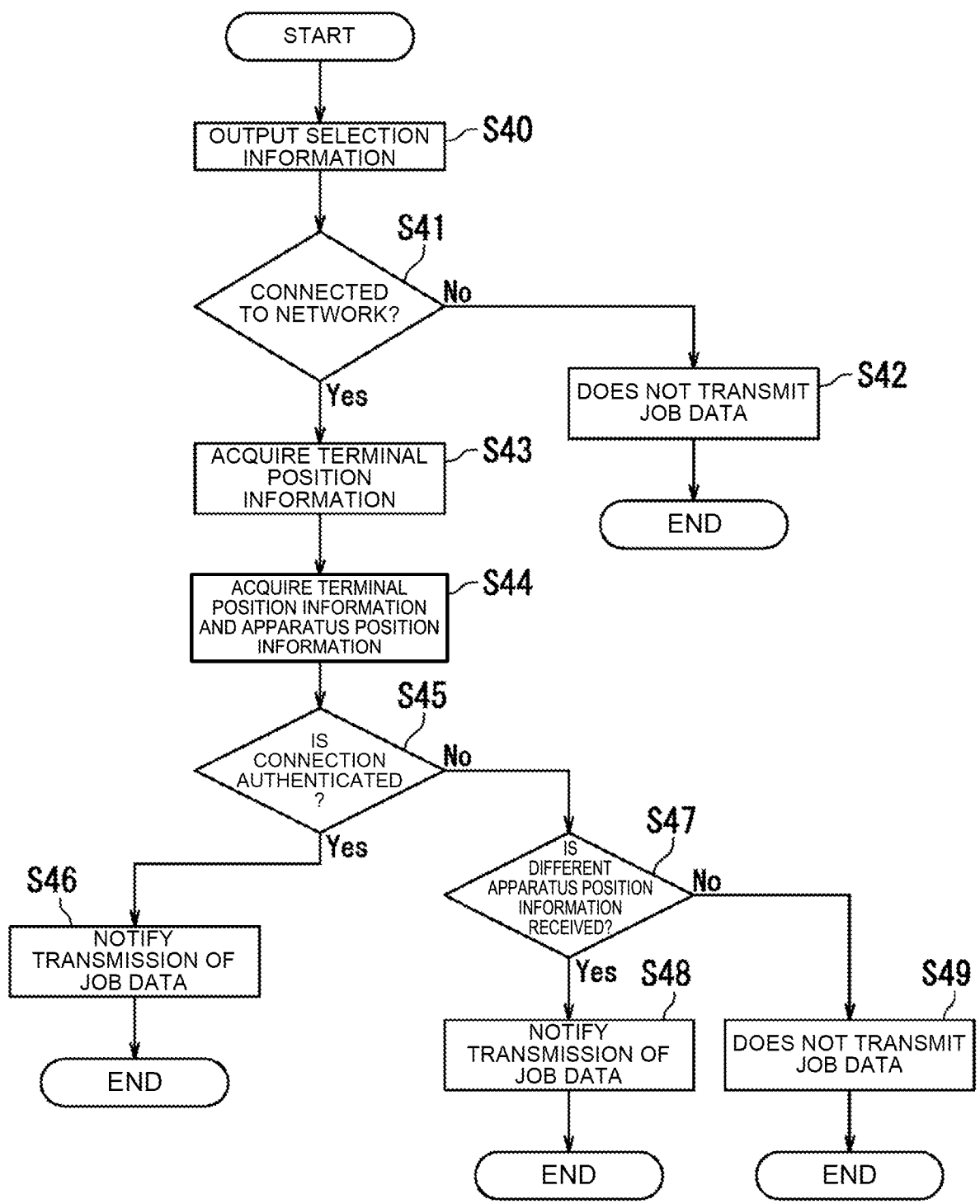
FIG. 6 is a flowchart illustrating another control of the image forming system according to the present embodiment.
Figure 7:
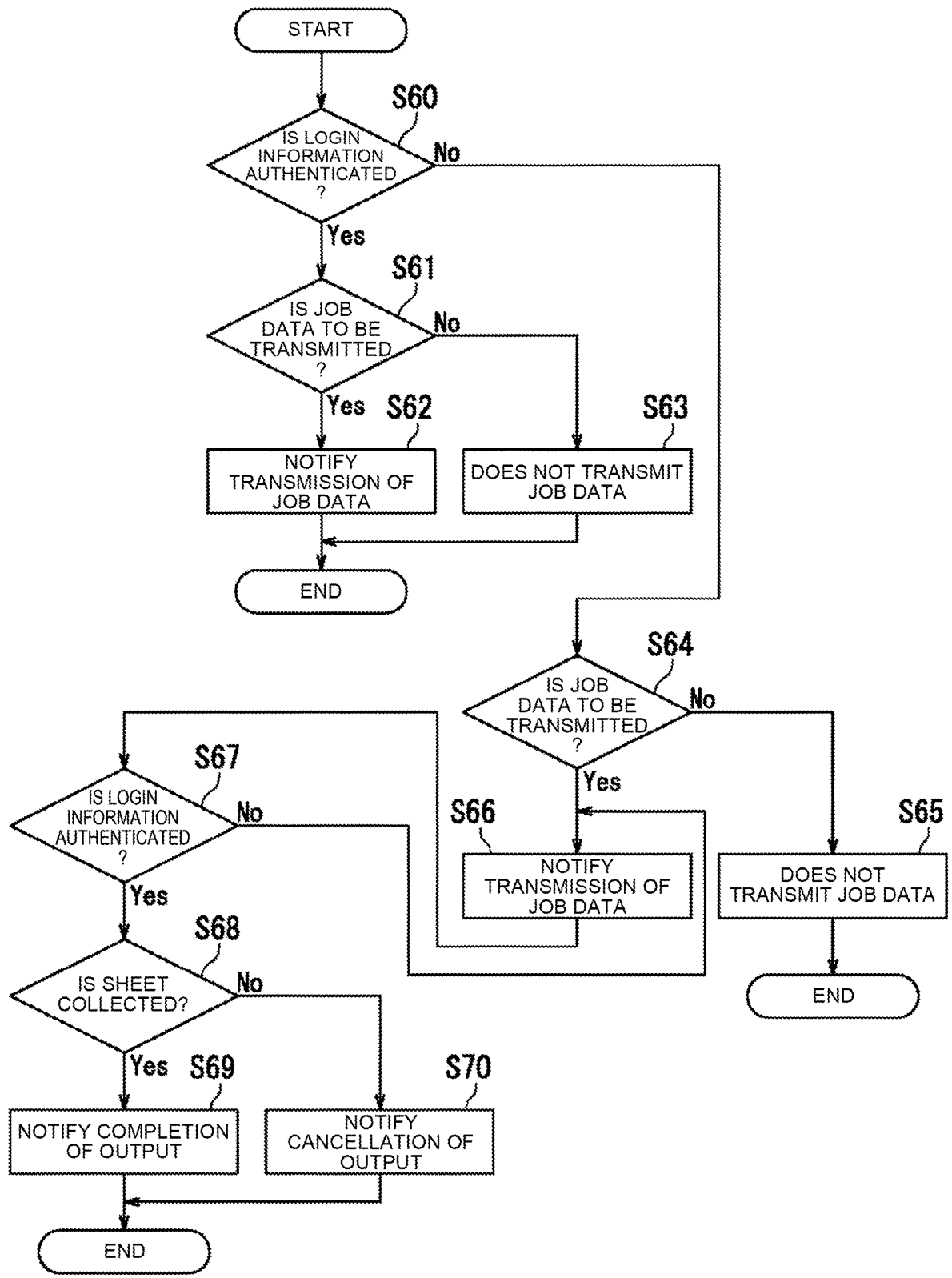
FIG. 7 is a flowchart illustrating yet another control of the image forming system according to the present embodiment.

Next, another control of the image forming system 1 according to the present embodiment will be described with reference to FIGS. 6 and 7. FIGS. 6 and 7 are flowcharts illustrating other controls of the image forming system 1 according to the present embodiment, respectively. Some or of the flowcharts of FIGS. 6 and 7 may be applied to other flowcharts.

The flowchart illustrated in FIG. 6 includes from step S40 to step S49. A specific description is provided below.

In step S40 of FIG. 6, the selection part 200 outputs the selection information indicating the reception terminal 3. The process proceeds to step S41.

In step S41, the selection part 200 checks that the reception terminal 3 and the image forming apparatus 6 are connected. That is, the selection part 200 checks that the image forming apparatus 6 and the reception terminal 3 are connected to the same network as the network to which the transmission terminal 2 and the reception terminal 3 are connected. If the check result is negative (No), the process proceeds to step S42. If the check result is affirmative (Yes), the process proceeds to step S43.

If No in step S41, the transmission part 22 does not transmit job data in step S42. That is, the transmission part 22 does not provide job data. The process ends.

If Yes in step S41, the terminal-side GPS part 30 acquires the terminal position information of the reception terminal 3 in step S43. The process proceeds to step S44.

In step S44, the position information acquisition part 201 acquires the terminal position information of the reception terminal 3 and apparatus position information of the image forming apparatus 6. The process proceeds to step S45.

In step S45, the authentication part 203 authenticates that the reception terminal 3 and the image forming apparatus 6 are connected. When the authentication was successful (Yes), the process proceeds to step S46. When the authentication was not successful (No), the process proceeds to step S47.

If Yes in step S45, in step S46, the notification part 23 of the transmission terminal 2 notifies the user that the job data has been transmitted. The process ends.

If No in step S45, in step S47, the terminal reception part 21 determines whether to receive the apparatus position information of yet another image forming apparatus 6. When the apparatus position information has been received (Yes), the process proceeds to step S48. When the apparatus position information cannot be received (No), the process proceeds to step S49.

If Yes in step S47, in step S48, the notification part 23 of the transmission terminal 2 notifies the user that the job data has been transmitted. The process ends.

If No in step S47, in step S49, the transmission part 22 does not transmit the job data. The process ends.

Next, the flowchart illustrated in FIG. 7 includes from step S60 to step S70. A specific description is provided below.

In step S60 illustrated in FIG. 7, the login state authentication part 204 authenticates the login state based on the login state information of the reception terminal 3. When the authentication was successful (Yes), the process proceeds to step S61. When the authentication was not successful (No), the process proceeds to step S64.

If Yes in step S60, the controller 20 determines whether to transmit job data in step S61. If the job data is to be transmitted (Yes), the process proceeds to step S62. If the job data is not to be transmitted (No), the process proceeds to step S63.

If Yes in step S61, the notification part 23 of the transmission terminal 2 notifies the user that the job data has been transmitted in step S62. The process ends.

If No in step S61, the transmission part 22 does not transmit the job data in step S63. The process ends.

Next, when No is determined in step S60, in step S64, the controller 20 determines whether the job data is transmitted. If the job data is not to be transmitted (No), the process proceeds to step S65. If the job data is to be transmitted (Yes), the process proceeds to step S66.

If not to be transmitted (no in step S64), in step S65, the transmission part 22 does not transmit the job data. The process ends.

If job data is to be transmitted (Yes in step S64), in step S66, the notification part 23 of the transmission terminal 2 notifies the user that job data has been transmitted. Next, the controller 20 holds the job data without transmitting it. The process proceeds to step S67.

In step S67, the login state authentication part 204 authenticates the login state based on the login state information of the reception terminal 3. That is, the login state authentication part 204 authenticates whether or not the user is present.

If the login state has been authenticated (Yes), the process proceeds to step S68.

When the login state is not authenticated (No), the process returns to step S66. Next, the process of step S66 and subsequent steps is repeated.

When the login state is authenticated (Yes), in step S68, the apparatus notification part 63 detects whether the user has collected the sheet and provides the notification of the detection information.

When it is detected that the user has collected the sheet (Yes in step S68), the process proceeds to step S69. When it is not detected that the user has collected the sheet (No in step S68), the process proceeds to step S70.

When detecting that the user has collected the sheet (Yes in step S68), in step S69, the notification part 23 of the transmission terminal 2 notifies the user that the output of the job data is completed. The process ends.

If not detecting that the user has collected the sheet (No in step S68), in step S70, the notification part 23 of the transmission terminal 2 notifies the user that the output of the job data has been cancelled. The process ends.

According to the image forming system of the present disclosure, the authenticated reception terminal can cause the authenticated image forming apparatus to form the image of the document.

The embodiment of the present disclosure has been described above with reference to the drawings. Provided that the present disclosure is not limited to the above-described embodiment, and can be implemented in various aspects without departing from the spirit of the present disclosure. The drawings may schematically illustrate respective constituent elements as main constituent elements for easier understanding. The number of each constituent element illustrated in the drawings and the like may be different from actual ones for convenience of drawing creation. Furthermore, the constituent elements illustrated in the above-described embodiment are examples and are not particularly limited, and various changes can be made therein without substantially departing from the effects of the present disclosure.

What is claimed is:

1. An image forming system comprising:
a transmission terminal;
a reception terminal; and
an image forming apparatus,
the transmission terminal including:
   a selection part that selects the reception terminal that transmits image data and outputs selection information indicating the reception terminal that is selected;
   a terminal reception part that receives terminal position information of the reception terminal and apparatus position information of the image forming apparatus;
   a position information acquisition part that acquires the terminal position information of the reception terminal and the apparatus position information of the image forming apparatus;
   an authentication part that authenticates the reception terminal and the image forming apparatus based on the terminal position information of the reception terminal and the apparatus position information of the image forming apparatus, and outputs authentication information; and
   a transmission part that transmits job data based on the authentication information indicating that the reception terminal and the image forming apparatus have been authenticated,
the reception terminal including:
   a terminal-side position information acquisition part that acquires the terminal position information of the reception terminal based on the selection information; and
   a terminal transmission part that transmits the terminal position information, and
the image forming apparatus including:
   an image forming part that forms an image of the job data on a sheet.

2. The image forming system according to claim 1, wherein
the image forming part includes an apparatus notification part that provides a notification of login state information indicating whether the image forming apparatus is logged in,
the transmission terminal further includes a login state authentication part that authenticates a login state of the image forming apparatus based on the login state information, and the transmission part of the transmission terminal further transmits the job data when the image forming apparatus is authenticated as being in the login state.

3. The image forming system according to claim 2, wherein
the image forming apparatus further includes an apparatus transmission part that transmits an apparatus IP address,
the terminal transmission part of the reception terminal further transmits a terminal IP address,
the terminal reception part of the transmission terminal further receives the terminal IP address and the apparatus IP address,
the transmission terminal further includes an apparatus information acquisition part that acquires the terminal IP address and the apparatus IP address, and
the authentication part of the transmission terminal authenticates the reception terminal and the image forming apparatus further based on the terminal IP address and the apparatus IP address.

4. The image forming system according to claim 1, wherein
the reception terminal further includes a terminal notification part that provides a notification of the login state information indicating whether the reception terminal is logged in.

5. The image forming system according to claim 1, wherein
the image forming apparatus further includes a password transmission part that transmits a password input by a user,
the terminal reception part of the transmission terminal receives the password,
the transmission terminal further includes a password authentication part that authenticates the password and outputs the authentication information,
the transmission part of the transmission terminal transmits the authentication information to the image forming apparatus,
the image forming apparatus further includes an apparatus reception part that receives the authentication information, and
the image forming part of the image forming apparatus forms the image of the job data on the sheet based on the authentication information.

6. The image forming system according to claim 1, wherein
the image forming apparatus further includes a storage part that stores the job data.

7. The image forming system according to claim 1, wherein
the image forming system further includes at least one of a cloud, a server, and a storage device, and
at least one of the cloud, the server, and the storage device stores the job data.

8. The image forming system according to claim 6, wherein
the storage part of the image forming apparatus deletes the job data when the image forming apparatus does not form the image of the job data on the sheet for a predetermined time.

9. The image forming system according to claim 7, wherein the cloud, the server, or the storage device deletes the job data when the image forming apparatus does not form the image of the job data on the sheet for a predetermined time.

* * * * *